United States Patent
Wu et al.

(10) Patent No.: US 6,360,197 B1
(45) Date of Patent: Mar. 19, 2002

(54) METHOD AND APPARATUS FOR IDENTIFYING ERRONEOUS CHARACTERS IN TEXT

(75) Inventors: Andi Wu; George E. Heidorn, both of Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/420,661

(22) Filed: Oct. 19, 1999

Related U.S. Application Data

(63) Continuation-in-part of application No. 08/671,203, filed on Jun. 25, 1996, now Pat. No. 5,999,896.

(51) Int. Cl.[7] .......................... G06F 17/27; G06F 17/21
(52) U.S. Cl. ............................................. 704/9; 707/533
(58) Field of Search .................. 704/1, 9–10; 707/530, 707/532, 533, 535, 542

(56) References Cited

U.S. PATENT DOCUMENTS

| | | | | |
|---|---|---|---|---|
| 5,060,154 A | * | 10/1991 | Duncan, IV | 704/1 |
| 5,475,558 A | * | 12/1995 | Schabes et al. | 704/8 |
| 5,535,119 A | * | 7/1996 | Ito et al. | 707/535 |
| 5,634,134 A | * | 5/1997 | Kumai et al. | 707/535 |
| 5,715,469 A | * | 2/1998 | Halstead, Jr. et al. | 704/9 |
| 5,774,834 A | | 6/1998 | Visser | 704/10 |
| 5,946,648 A | * | 8/1999 | Halstead, Jr. et al. | 704/9 |
| 6,035,269 A | * | 3/2000 | Kim | 704/9 |
| 6,173,252 B1 | * | 1/2001 | Qiu et al. | 704/9 |
| 6,175,834 B1 | * | 1/2001 | Cai et al. | 707/102 |

FOREIGN PATENT DOCUMENTS

| | | | |
|---|---|---|---|
| EP | 0 093 249 | 11/1983 | G06F/15/20 |
| JP | 61234461 | 10/1986 | G06F/15/20 |
| JP | 02136959 | 5/1990 | G06F/15/20 |
| JP | 07110844 | 4/1995 | G06F/17/22 |
| WO | WO 99/67724 | 12/1999 | G06F/17/28 |

\* cited by examiner

*Primary Examiner*—Patrick N. Edouard
(74) *Attorney, Agent, or Firm*—Theodore M. Magee; Westman, Champlin & Kelly, P.A.

(57) ABSTRACT

A method and apparatus are provided that identify confused characters in a text written in a language having a large number of distinct characters. To identify the confused characters, a set of characters from the text are segmented into individual characters. A confusable character for at least one of the segmented characters is then retrieved. Lexical information is identified for both the segmented characters and the retrieved confusable characters and is used to parse the segmented characters and the confusable characters. Based on the parse, a segmented character is identified that has been confused with a confusable character.

28 Claims, 7 Drawing Sheets

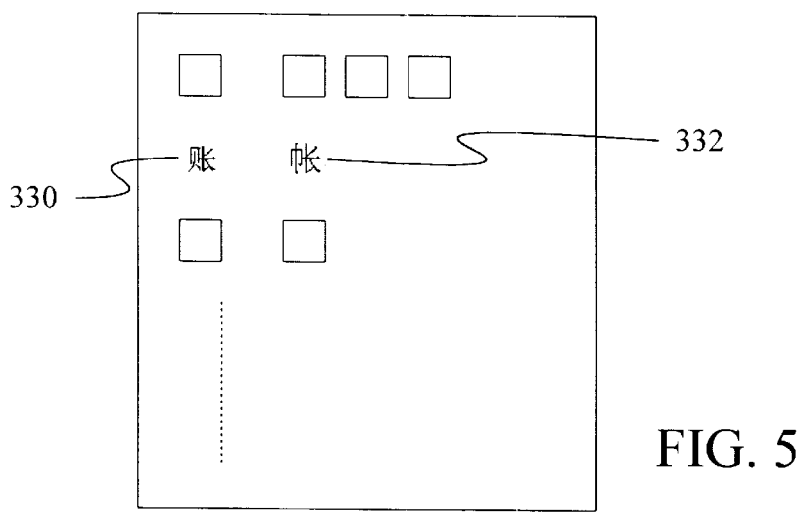
FIG. 4
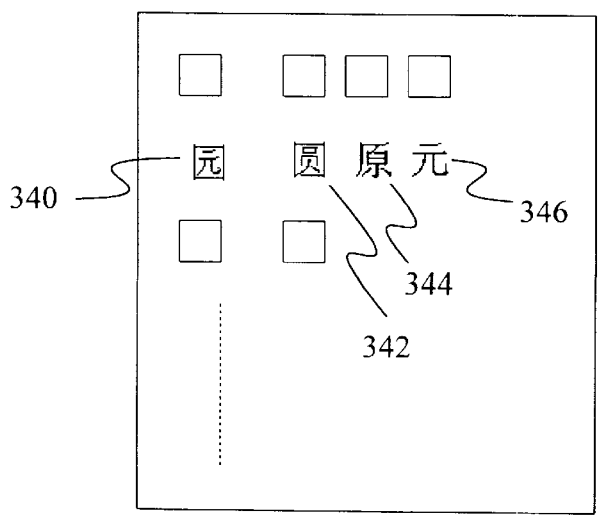
FIG. 5
FIG. 6

METHOD AND APPARATUS FOR IDENTIFYING ERRONEOUS CHARACTERS IN TEXT

REFERENCE TO RELATED APPLICATIONS

The present application is a continuation-in-part of a U.S. application having Ser. No. 08/671,203, filed on Jun. 25, 1996 now U.S. Pat. No. 5,999,896 and entitled METHOD AND SYSTEM FOR IDENTIFYING AND RESOLVING COMMONLY CONFUSED WORDS IN A NATURAL LANGUAGE PARSER.

BACKGROUND OF THE INVENTION

The present invention relates to text processing. In particular, the present invention relates to identifying erroneous characters in text.

In many languages, a large set of distinctive characters is used to represent individual words or small parts of words. Examples of such languages are Chinese, Japanese, Korean, and Arabic. Instead of relying on a small alphabet of symbols to build individual words, these languages rely on thousands of distinctive characters. For example, written Chinese uses more than 5,000 distinctive characters.

One problem with such languages is that many of the characters have a similar shape making it easy for keyboard operators to select the wrong character when entering text using a keystroke method. Errors can also occur when characters are entered phonetically, since many characters have similar pronunciations.

Before performing certain operations on a text, such as checking grammar, synthesizing speech from text, and performing natural language parsing, it is helpful to identify any erroneous characters that may be in the text and find out the correct characters that are intended. Under the prior art, erroneous characters have been detected using simple bigram models that determine the probability of any two characters appearing next to each other in a text. These statistical models are less than ideal because of the scarcity of large sets of text from which to build the models. In most such systems, the systems are only able to detect an erroneous character 54% of the time and are only correct in identifying erroneous characters 61% of the time. In addition, they are often unable to suggest the correct characters. Thus, a better technique for identifying erroneous characters in languages such as Chinese, Japanese, Korean and Arabic would be beneficial.

SUMMARY OF THE INVENTION

A method and apparatus are provided that identify confused characters in a text written in a language having a large number of distinct characters. To identify the confused characters, a set of characters from the text are segmented into individual characters. A confusable character for at least one of the segmented characters is then retrieved. Lexical information is identified for both the segmented characters and the retrieved confusable characters and is used to parse the segmented characters and the confusable characters. Based on the parse, a segmented character is identified that has been confused with a confusable character.

In many embodiments of the invention, the confusable characters are retrieved from a confusable character list that associates segmented characters with characters that may be confused with the segmented character. Under some embodiments, the confusable character list contains characters that are graphically similar to their respective segmented character. In other embodiments, the confusable character list contains characters that are phonetically similar to their respective segmented character. In still other embodiments, the invention selects between a graphically similar list and a phonetically similar list based on the method that was used to place the characters into computer-readable form.

In some embodiments of the invention, multi-character words are constructed from the segmented characters and the permutations formed by selectively replacing segmented characters with confusable characters.

BRIEF DESCRIPTION OF THE DRAWINGS

FIG. 4 is a layout for a lexical record under one embodiment of the present invention.

FIG. 5 is list of graphically confusable characters under one embodiment of the present invention.

FIG. 6 is a list of phonetically confusable characters under a second embodiment of the present invention.

DETAILED DESCRIPTION OF ILLUSTRATIVE EMBODIMENTS

Figure 1:
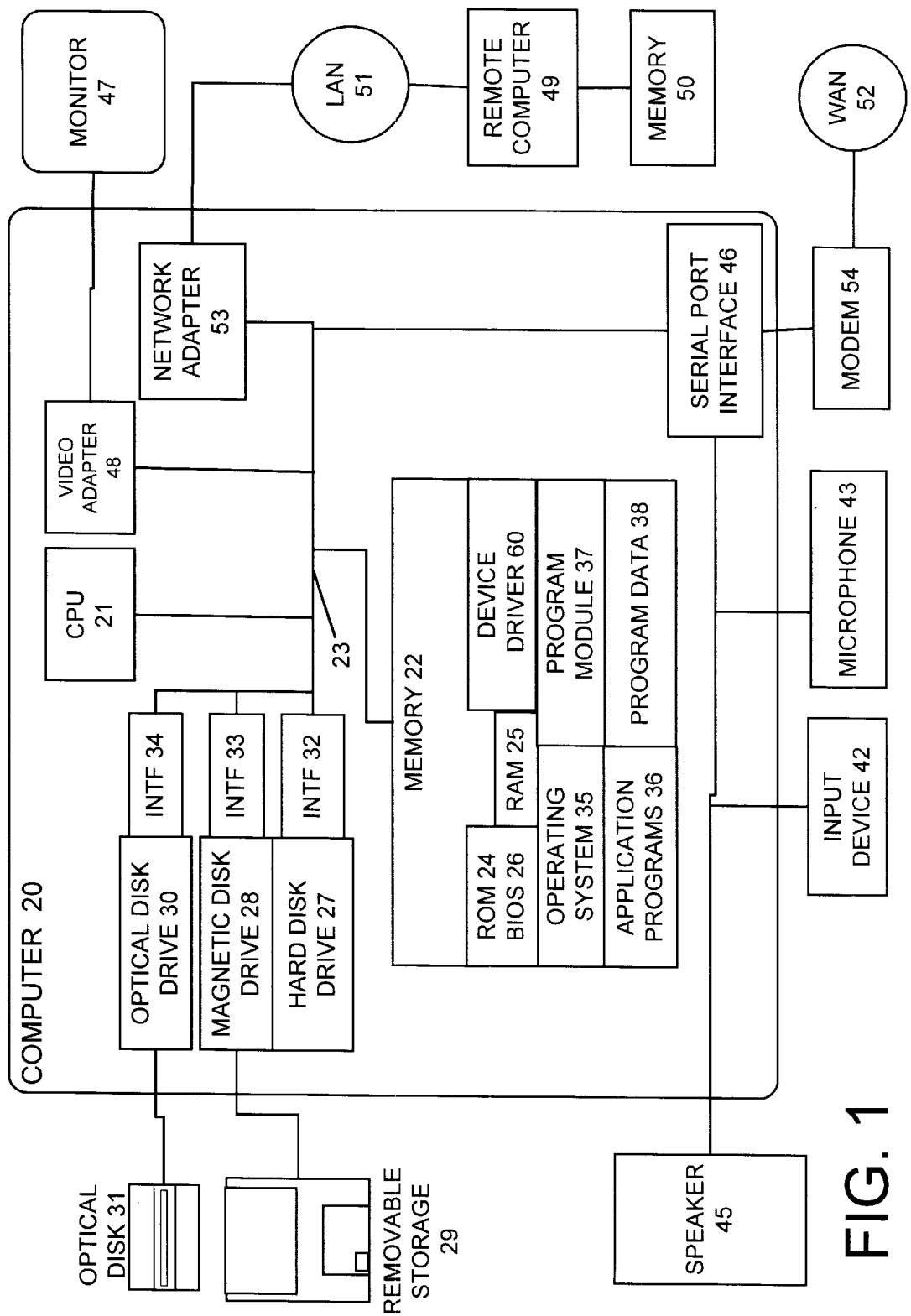
FIG. 1 is a general computing environment in which the present invention may be practiced.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
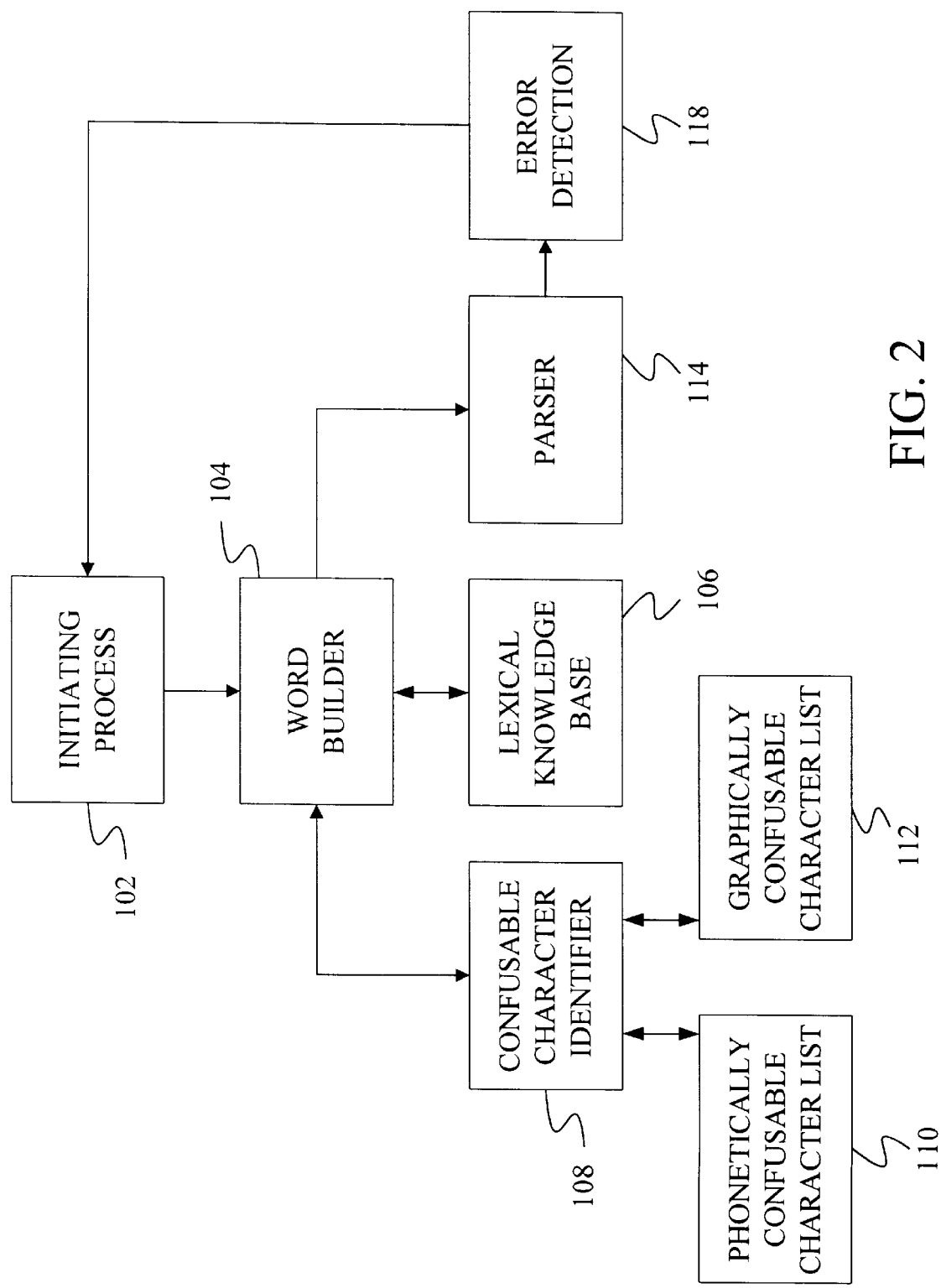
FIG. 2 is a more detailed block diagram of the software components particular to one embodiment of this invention.

FIG. 2 is a block diagram of software components of one embodiment of the present invention. In FIG. 2, an initiating process 102 passes a set of characters to a word builder 104. Initiating processor 102 can be a local processor in the computer system of FIG. 1 or may be a remote process communicating with word builder 104 through a network connection. The set of characters passed to word builder 104 may be an entire text or may be limited to a single sentence of text. Word builder 104 cooperates with other components of FIG. 2 to identify erroneous characters in the set of characters through a process that is shown in the flow diagram of FIG. 3. The method shown in FIG. 3 is only one embodiment of the present invention and other embodiments are possible.

Figure 3:
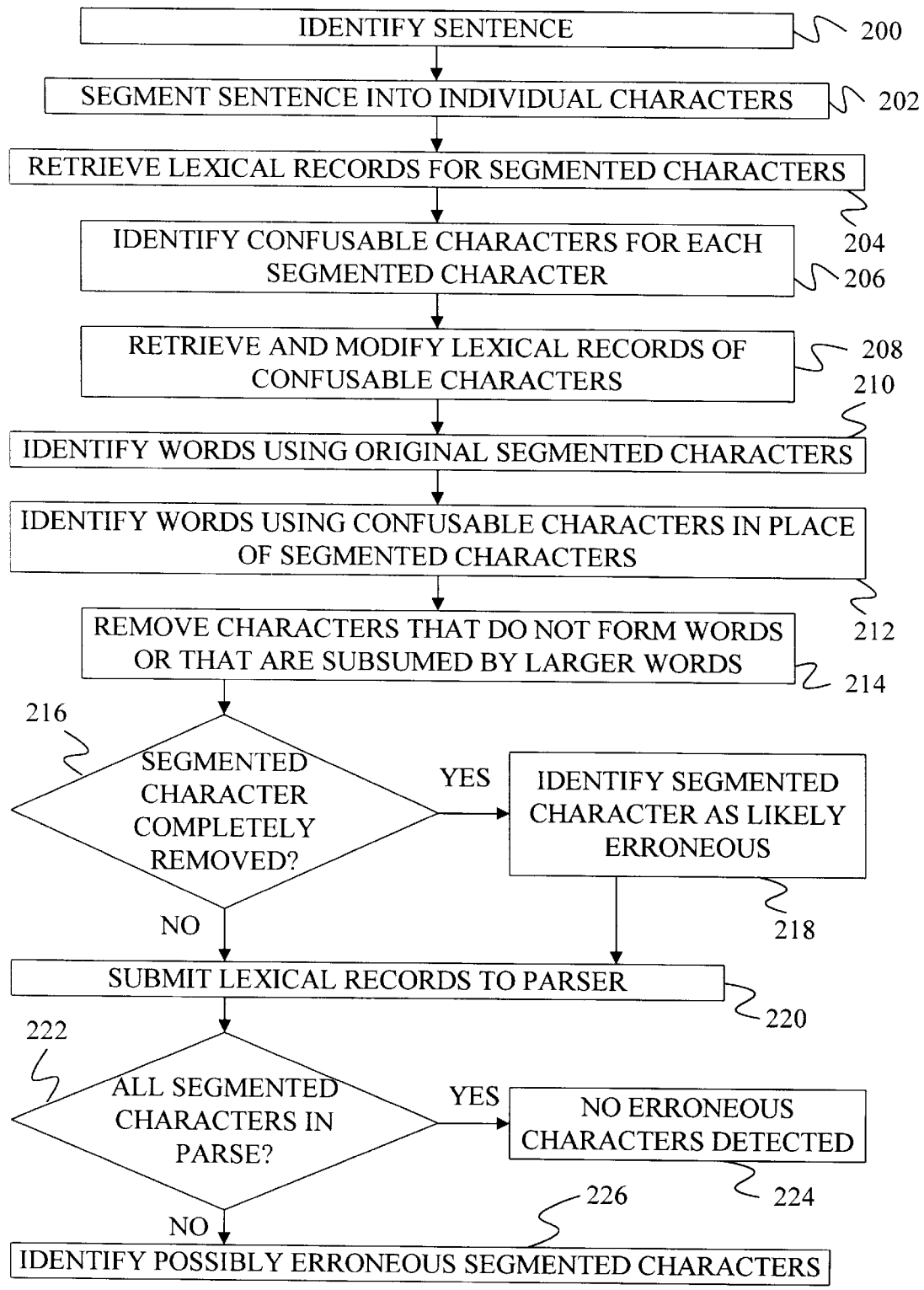
FIG. 3 is a flow diagram of a method of identifying erroneous characters under one embodiment of the present invention.

In step 200 of FIG. 3, word builder 104 identifies a sentence in the text if more than one sentence has been passed to the word builder. At step 202, word builder 104 segments the sentence into individual symbols or characters. For each character, word builder 104 accesses a lexical knowledge base 106 to retrieve a lexical record for each character.

FIG. 4 shows an example of a lexical record layout 300, which is one embodiment of the layout of the lexical records stored in lexical knowledge base 106. Record layout 300 includes a reference field 302 used to identify each character in the lexical knowledge base, a character position field 304 used to identify where this character is allowed to appear in multi-character words, a next position field 306 used to identify a list of characters that are known to appear after this character when this character appears as the first character in multi-character words, a part-of-speech field 308 used to identify this characters known parts of speech when the character represents a word by itself, an added-as-replacement-for field 310 used to indicate that this character has been added before the parse as a possible confusable character that should be used in place of a character entered by the user, and an IgnoreParts field 312 that indicates whether a multi-character word can be divided into smaller words. The use of these fields is discussed further below.

Once word builder 104 has retrieved the lexical records for the segmented characters, the process of FIG. 3 continues at step 206 where word builder 104 invokes a confusable character identifier 108 to identify a set of confusable characters for each of the segmented characters. These confusable symbols can include symbols that have a similar pronunciation to the segmented symbol or symbols that have a similar appearance to the segmented symbol, or both.

Symbols that have the same pronunciation are included under some embodiments because characters are sometimes entered into a computer by using a phonetic representation of the character. The computer then converts the phonetic representation into the character. If the user makes an error in producing the phonetic representation of the character or if the computer selects the wrong character, the correct character will have a similar pronunciation but may look substantially different from the segmented character. However, many of the phonetically similar words are also graphically similar.

Symbols that have the same appearance are included as confusable symbols in embodiments where the characters have been input using a keyboard that allows the user to select the character directly or that allows the user to build the character from smaller graphical units.

To identify the confusable characters for each segmented character, confusable character identifier 108 accesses a list or multiple lists of confusable characters such as confusable character lists 110 and 112 of FIG. 2. FIG. 5 shows an embodiment of one such list for confusable characters that have the same appearance as segmented characters. FIG. 6 shows an embodiment of one such list of confusable characters that have a similar pronunciation. In the embodiments of FIGS. 5 and 6, confusable character identifier 108 searches for each segmented character in the respective list. Upon finding an entry for the segmented character, such as entry 330 of FIG. 5 or entry 340 of FIG. 6, confusable character identifier 108 retrieves the confusable characters listed in that entry, such as character 332 in entry 330 or characters 342, 344, and 346 in entry 340.

Those skilled in the art will recognize that although the characters themselves are shown in FIGS. 5 and 6, the actual list in most embodiments includes only an alphanumeric reference for the characters. In addition, although the lists of FIGS. 5 and 6 show a group of confusable characters for each segmented character entry in the lists, in other embodiments, each list is an array of linked lists where each character points to a single confusable character. The confusable character similarly points to one other confusable character. Under one embodiment, confusable character identifier 108 traverses the linked list associated with each segmented character and retrieves all of the characters along the linked list until the list returns to the segmented character, the linked list ends, or a maximum number of confusable characters has been retrieved. Although not discussed in detail, still other forms for the confusable character lists that are within the skill of the art are included within the scope of the present invention.

Once the confusable characters have been retrieved for each segmented character at step 206 of FIG. 3, control is returned to word builder 104, which then retrieves the lexical records for each confusable character at step 208. As word builder 104 retrieves the lexical records for the confusable characters, it modifies the records to indicate that this record is for a character that may replace another character in the original text. Specifically, word builder 104 modifies the entry in the added-as-replacement-for field of the record, which was described above in connection with FIG. 4. Thus, by examining the added-as-replacement-for field, later components can distinguish the original characters from the confusable characters that were added by confusable character identifier 108.

At step 210 of FIG. 3, word builder 104 identifies multi-character words from the original individual segmented characters. The process for identifying these multi-character words is shown in the flow diagram of FIG. 7. The process begins at step 601 of FIG. 7 where a starting position marker is set to the first character of the sentence. At step 602, a candidate word length is set to the largest expected word length for the language. For example, in Chinese, the longest words have seven or eight characters. . Thus, the candidate word length would be set to seven or eight for Chinese. With the word length set, all of the characters from the starting position marker to the end of the word length form a current candidate word.

Figure 7:
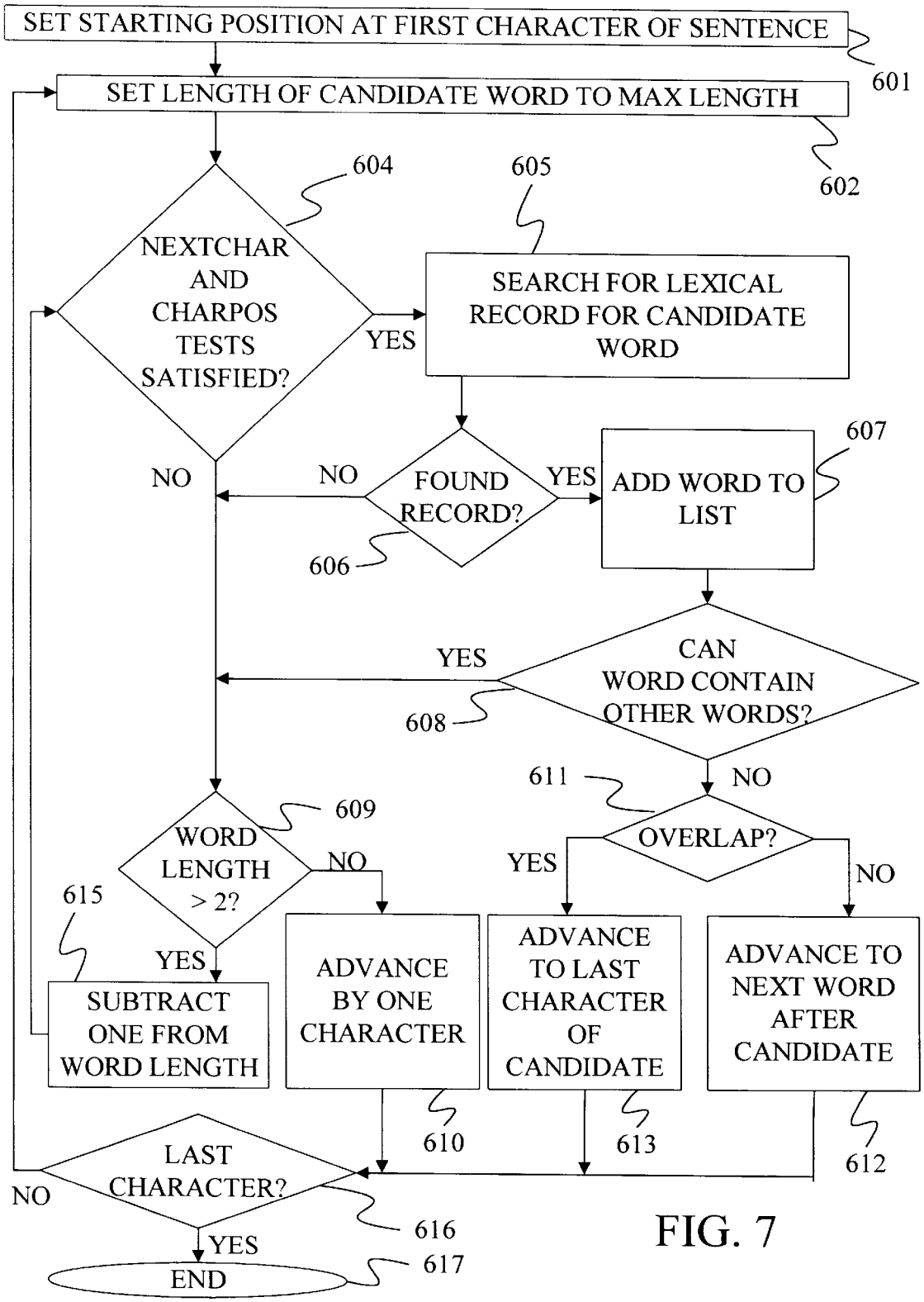
FIG. 7 is a flow diagram of a method for constructing words under one embodiment of the present invention.

At step 604 of FIG. 7, the lexical record of each character within the current candidate word is examined to determine if the character is occupying a valid position for a multi-character word. Specifically, character position field 304 is examined to determine if each character is in a valid position for a word having a length equal to the candidate word length. In most embodiments, character position field 304 contains position pairs that indicate a valid position for a character in a word of a particular length. For example, the pair 2,5 would indicate that a character can appear in the second position of a five character word.

If each character satisfies the character position test, word builder 104 determines if the first character in the candidate word is followed by an allowed character for building multi-character words. Word builder 104 does this by comparing the character after the first character to a list of characters in next character field 306 of the first character's lexical record. If the next character is in the next character field of the lexical record, the current candidate word satisfies the next character requirement.

If the candidate word satisfies the character position and next character test, the process of FIG. 7 continues at step 605 where the process searches for the candidate word's lexical record in lexical knowledge base 106. If the candidate word's lexical record is found at step 606, the process continues at step 607 where the candidate word is added to the list of original segmented characters as a possible word in the sentence.

At step 608, word builder 104 examines the candidate word to see if it can be broken down into other words. This step is performed because characters of some languages can be combined in different ways to form different words. To determine if the candidate word can be divided into smaller words, word builder 104 looks at the IgnoreParts field of the lexical record for the word. If the IgnoreParts field is clear, the candidate word can be divided into smaller words. If the IgnoreParts field is set, the candidate word cannot be divided into smaller words.

If a candidate word can be divided into smaller words at step 608, or if the candidate word is not in the lexical knowledge base at step 606 or if the characters of the candidate word do not satisfy the character position or next character test of step 604, the process continues at step 609 where the length of the candidate word is tested to see if it is greater than 2. If the candidate word length is greater than 2, the word length is shortened by one character at step 615 and the process returns to step 604 using the new candidate word length.

If the candidate word cannot be divided into smaller words at step 608, the process continues at step 611. In step 611, the candidate word is examined to see if it overlaps another multi-character word. The process for determining if the candidate word overlaps another word is shown in the flow diagram of FIG. 8.

Figure 8:
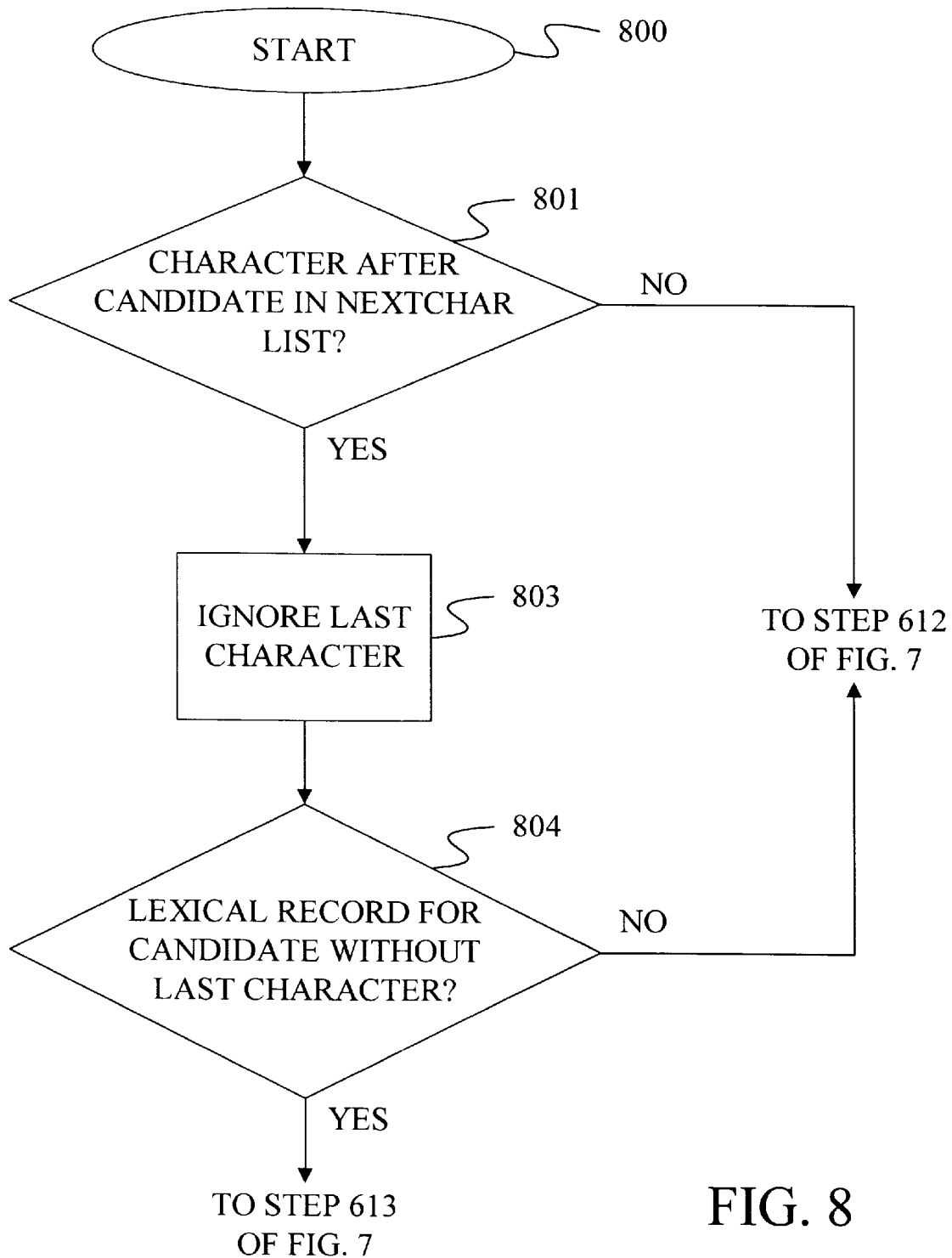
FIG. 8 is a flow diagram of a method of identifying overlapping words under one embodiment of the invention.

The process of FIG. 8 begins at step 800 and proceeds to step 801 where the character after the candidate word is compared to the list of valid next characters in the lexical record for the last character of the candidate word. If the character after the candidate word is not in the next character list, there is no overlap and the process continues at step 612 of FIG. 7. If the character after the candidate word is in the next character list, the process continues at step 803 where a new candidate word is formed by ignoring the last character of the current candidate word. Word builder 104 then tries to find a lexical record for the new candidate word. If the lexical record cannot be found at step 804, there is no overlap and the process continues at step 612 of FIG. 7. If the lexical record is found at step 804, there may be overlap and the process continues at step 613 of FIG. 7.

At step 612 of FIG. 7, there is no overlap between the candidate word and the next word. As such, the starting position marker is moved to the character after the candidate word. At step 613, there is overlap between the last character of the candidate word and the next word. As such, the starting position marker is moved to the last character of the current candidate word.

If at step 609 above the word length of the candidate word is not greater than 2, the starting position marker is advanced forward by one character at step 610. After step 610, 612, or 613, the process continues at step 616 where word builder 104 determines if this is the last character in the sentence. If this is not the last character in the sentence, the process returns to step 602 where the candidate word length is reset to the maximum word length for the language. If this is the last character in the sentence, the process ends at step 617.

After step 617 of FIG. 7, step 210 of FIG. 3 is complete and the process of FIG. 3 continues at step 212. In that step, word builder 104 selectively replaces the original segmented characters with the confusable characters identified in step 206 and attempts to build additional words with the confusable characters. The process for performing this replacement and word building under one embodiment of the invention is shown in the flow diagram of FIG. 9.

Figure 9:
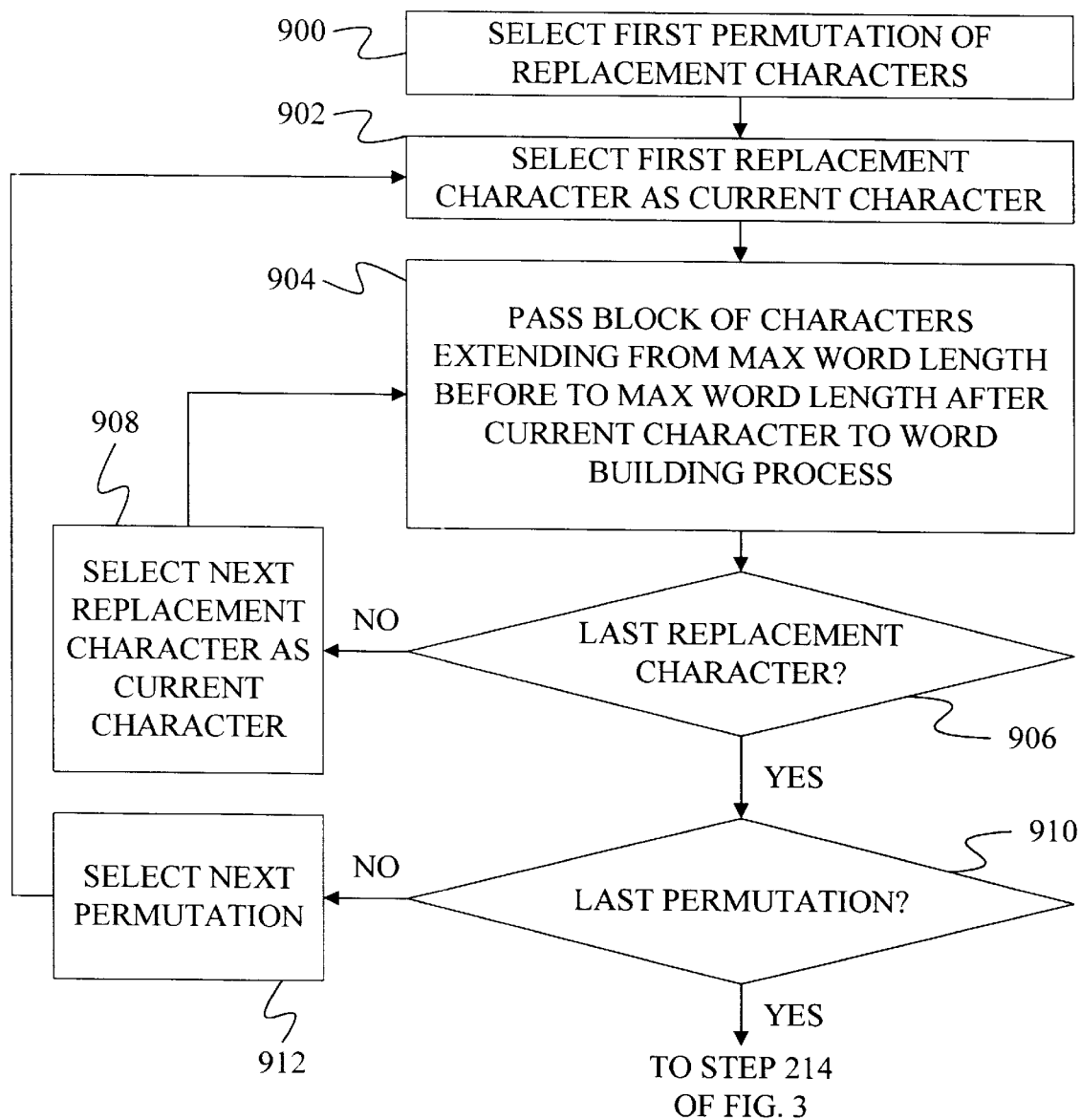
FIG. 9 is a flow diagram of a method of identifying words using confusable characters under one embodiment of the present invention.

The process of FIG. 9 begins at step 900 where the first permutation of replacement characters is selected. Under the embodiment of the invention shown in FIG. 9, more than one original character in the sentence can have a confusable character identified with it and more than one confusable character can be identified for each original character. In order to insure that all possible words are considered, every permutation for replacing the original characters in the sentence with confusable characters must be considered separately. Step 900 of FIG. 9 simply selects one of these permutations.

After step 900, the process continues at step 902 where the first confusable character in the permutation is selected as a current character. At step 904 a block of characters surrounding and including the current character are passed to the process of FIG. 7 to identify possible words in the block of characters. In many embodiments, the maximum number of characters in a word for the language is used to determine how many characters are to be passed in the block. Thus, enough characters before the current character are passed so that the current character is the last character in the longest possible word and enough characters after the current character are passed so that the current character is the first character in the longest possible word. For example, the longest word in Chinese has seven characters. Thus, the six characters before the current character and the six characters after the current character are passed to the process of FIG. 7 when the characters are Chinese characters. Of course, if the current character is so close to the beginning of a sentence or so close to the end of a sentence that the desired number of characters are not present, step 904 simply passes the available characters within the desired range.

After all of the possible words within the passed block have been identified in the process of FIG. 7, the process of FIG. 9 continues at step 906 where the current permutation is examined to see if there are any other replacement characters in the permutation. If this is not the last replacement character in the permutation, the next replacement character is selected as the current character at step 908 and the process returns to step 904.

If this is the last replacement character in the current permutation at step 906, the process continues at step 910 where word builder 104 determines if this is the last permutation of replacement characters. If this is not the last permutation, the next permutation of replacement characters is selected at step 912 and the process returns to step 902. If this is the last permutation of replacement characters, the process continues at step 214 of FIG. 3.

When the process reaches step 214 of FIG. 3, multi-character words have been identified for the original segmented characters and for all of the permutations of possible confusable characters used in place of the original characters. In addition, each individual character, both original and confusable, has been assumed to be a word. At step 214, each individual character is examined to determine if it is a word by itself. If it is not a word by itself, its lexical record is removed from list of lexical records generated for the sentence. Step 214 also removes characters or multi-character words that are found within a larger word that cannot be divided into smaller words. This is done by examining the words in order of size and determining if the IgnoreParts field is set for any of the words. If it is set, the smaller words and individual characters that are found within the word are removed from the list. If the IgnoreParts field is clear, the next largest word is considered.

Once the subsumed characters and small words have been removed and the individual characters that do not form words by themselves have been removed, the process continues at step 216. In step 216, word builder 104 determines if one of the original characters has been completely removed so that it is not found individually and is not found as part of a multi-character word. If an original character has been completely removed, the process continues at step 218 where the removed character is identified as likely being erroneous since it cannot be used to construct a word.

After step 218 or after step 216 if no original character has been completely removed, the process continues at step 220 where the remaining lexical records for the original and confusable characters and the lexical records for multi-character words containing original and confusable characters are passed to a parser 114 shown in FIG. 2. Parser 114 performs a logical parse by trying to combine the single characters and multi-character words into a complete logical sentence based on the parts of speech of each of the words. Such parsers are well known in the art.

Parser 114 can return a single successful parse, multiple successful parses or no successful parses. In the case of multiple parses, the parses are ranked according to their scores and only the top n parses are considered to be good parses. In one embodiment, only the highest-ranking parse is considered to be a good parse. Each of the good parses, if there are any, are then examined by an error detection component 118 of FIG. 2. Error detection component 118 determines if any of the original characters are missing from all of the good parses. (If each of the original characters is found in at least one good parse, the original text is assumed to be correct at step 224 of FIG. 3. However, for each original character that is not present in any of the good parses, error detection component 118 indicates that the original character may be in error at step 226. The determination of whether an original character is present in a good parse is accomplished by looking at the added-as-replacement-for field of the lexical records of each character in a good parse. If this field indicates that a character is a replacement character, error detection component 118 looks in the same location in other good parses to see if those parses also contain replacement characters at that position. If in all of the good parses the characters at a specific position indicate that they are replacement characters, the original character is likely in error. The indication that a character is possibly erroneous can be returned to the initiating process 102 or to some other process for display to the user.

An example of the process of FIG. 3 is described below in connection with the Chinese sentence: 他在那里结帐?
which contains two incorrect original characters at the third and sixth positions. The correct sentence should appear as:
他在哪里结账?
where the third and sixth characters have changed. The correct sentence translates into English as "Where is he settling accounts?"

The sentence containing typos is first segmented into individual symbols in step 202 and the lexical records for the symbols are retrieved at step 204. The affects of the steps are represented in a limited fashion by the word lattice below, which indents each character to show its location in the sentence and provides the possible part of speech of the character:

```
          他    PRON1
       :: 在    VERB1
       :: 在    ADV1
       :: 在    PREP1
       ::::  那    PRON2
       ::::  那    CONJ1
       ::::::  里    NOUN1
       ::::::::  结    VERB2
       ::::::::::  帐    POSP1 (n)
       ::::::::::::  ?    CHAR1
```

In this word lattice, the part of speech tag POSP is a dummy tag that is inserted since the corresponding character is not a word by itself.

At steps 206 and 208, the lexical records for characters that can be confused with the original characters are retrieved. The affects of these steps are shown as additional entries to the word lattice resulting in:

```
          他    PRON1
       :: 在    VERB1
       :: 在    ADV1
       :: 在    PREP1
       ::::  那    PRON2
       ::::  那    CONJ1
       ::::  哪    PRON3
       ::::::  里    NOUN1
       ::::::::  结    VERB2
       ::::::::::  帐    POSP1 (n)
       ::::::::::  账    NOUN2
       ::::::::::::  ?    CHAR1
```

Words are then constructed in step 210 using the original characters alone. This adds additional words to the word lattice resulting in:

```
          他    PRON1
       :: 在    VERB1
       :: 在    ADV1
```

```
       :: 在    PREP1
       ::::  哪    PRON3
       ::::  那    PRON2
       ::::  那    CONJ1
       ::::  哪里  PRON3
       ::::::  里    NOUN1
       ::::::::  结    VERB2
       ::::::::::  帐    POSP1 (n)
       ::::::::::  账    NOUN2
       ::::::::::::  ?    CHAR1
```

Additional words are constructed using the confusable characters in step 212 to produce a word lattice of:

```
          他    PRON1
       :: 在    VERB1
       :: 在    ADV1
       :: 在    PREP1
       ::::  哪里  PRON4
       ::::  那里  PRON5
       ::::  那    PRON2
       ::::  那    CONJ1
       ::::  哪    PRON3
       ::::::  里    NOUN1
       ::::::::  结账  VERB3
       ::::::::  结    VERB2
       ::::::::::  帐    POSP1 (n)
       ::::::::::  账    NOUN2
       ::::::::::::  ?    CHAR1
```

Words and characters that are subsumed by other words or that are not words by themselves are then eliminated at step 214 to produce a word lattice of:

```
          他    PRON1
       :: 在    VERB1
       :: 在    PREP1
       ::::  哪里  PRON4
       ::::  那里  PRON5
       ::::::::  结账  VERB3
       ::::::::::::  ?    CHAR1
```

A parse is then performed at step 220 resulting in a single successful parse of:

| QUES1 | NP1 | PRON1* | "他" |
|---|---|---|---|
|  | PP1 | PREP1 | "在" |
|  |  | PRON4* | "哪里" |
|  | VERB3* | "结账" |  |
|  | CHAR1 | "?" |  |

Since the only successful parse does not include the original characters 那 and 帐, these characters are marked as likely erroneous in step 226.

Although the present invention has been described with reference to particular embodiments, workers skilled in the art will recognize that changes may be made in form and detail without departing from the spirit and scope of the invention.

What is claimed is:

1. A method of identifying confused characters in a set of characters from a language having a large number of distinct characters, the method comprising:

segmenting the set of characters into individual segmented characters;

identifying lexical information based on at least one segmented character;

retrieving a confusable character for at least one segmented character;

identifying lexical information based on the confusable character;

parsing the set of characters based on the lexical information associated with the at least one segmented character and the lexical information associated with the confusable character to produce at least one successful parse; and identifying that the segmented character may have been confused for the confusable character based on the successful parse.

2. The method of claim 1 further comprising constructing words from the segmented characters and wherein identifying lexical information based on the segmented character comprises identifying lexical information for the constructed words and wherein parsing the set of characters further comprises parsing the set of characters based on the lexical information for the constructed words.

3. The method of claim 2 further comprising constructing words from the segmented characters and at least one confusable character by replacing a segmented character with a confusable character.

4. The method of claim 3 wherein identifying lexical information based on the confusable character comprises identifying lexical information for at least one constructed word that contains a confusable character and wherein parsing the set of characters further comprises parsing the set of characters based on the lexical information for at least one constructed word that contains a confusable character.

5. The method of claim 3 wherein constructing words comprises examining characters located before the confusable character in the set of characters to determine if the characters located before the confusable character can be combined with the confusable character to build a word.

6. The method of claim 5 wherein constructing words further comprises examining characters located after the confusable character in the set of characters to determine if the characters after the confusable character can be combined with the confusable character to build a word.

7. The method of claim 6 wherein constructing words further comprises determining if characters before and after the confusable character in the set of characters can be combined together with the confusable character to build a word.

8. The method of claim 3 further comprising, before parsing the set of characters, eliminating characters that do not form words by themselves and that cannot be used to construct a word.

9. The method of claim 8 further comprising, before parsing, identifying that a segmented character was confused for a confusable character when the segmented character is eliminated but the confusable character remains.

10. The method of claim 9 further comprising eliminating characters that are subsumed by a multi-character word.

11. The method of claim 3 wherein constructing words further comprises constructing words using all possible permutations for replacing segmented characters with confusable characters.

12. The method of claim 1 wherein retrieving a confusable character comprises determining an input method used to place the text into a computer-readable form and accessing a list of confusable characters that is produced based on the input method.

13. The method of claim 1 wherein identifying that the segmented character may have been confused for the confusable character comprises examining all successful parses, determining that the segmented character is missing from all of the successful parses and determining that the confusable character was found in at least one successful parse in place of the segmented character.

14. A computer-readable medium having computer-executable components comprising:

a segmenting component for segmenting a set of input characters into individual segmented characters;

a confusable character component for identifying confusable characters for the segmented characters;

a lexical knowledge base having lexical information for the segmented characters and the confusable characters;

a parsing component for parsing the segmented characters and confusable characters based in part on lexical information associated with the segmented characters and confusable characters to produce a parse; and an error detection component for identifying a segmented character that is confused with a confusable character based on the parse.

15. The computer-readable medium of claim 14 further comprising a word building component for combining segmented characters into multi-character words wherein the lexical knowledge base has lexical information for the multi-character words and the parsing component parses the segmented characters and the confusable characters based in part on the lexical information for the multi-character words.

16. The computer-readable medium of claim 15 wherein the word building component comprises a permutation routine capable of generating alternative sets of characters from the set of input characters by replacing selected segmented characters with confusable characters.

17. The computer-readable medium of claim 16 wherein the permutation routine is capable of generating all possible permutations of alternative sets of characters based on the segmented characters and the confusable characters.

18. The computer-readable medium of claim 16 wherein the word building component further comprises a block identifying routine capable of identifying a block of characters in an alternative set of characters, the block of characters including a confusable character, and wherein the word building component identifies multi-character words from the block of characters.

19. The computer-readable medium of claim 18 wherein the lexical knowledge base comprises lexical information for a multi-character word built from the block of characters generated by the block identifying routine and wherein the parsing component parses the segmented characters and confusable characters based on the lexical information for the multi-character word.

20. The computer-readable medium of claim 16 wherein the word building component further comprises a character removal routine capable of eliminating a segmented character so that it is not considered in parsing.

21. The computer-readable medium of claim 20 wherein the character removal routine eliminates a segmented character when the segmented character is not a word by itself and the segmented character does not form part of a multi-character word.

22. The computer-readable medium of claim 21 comprising an additional error detection unit capable of identifying a segmented character that is confused with a confusable character if the segmented character is eliminated by the character removal routine.

23. The computer-readable medium of claim 21 wherein the character removal routine eliminates a segmented character when the segmented character is subsumed by a multi-character word.

24. The computer-readable medium of claim 14 wherein the error detection component comprises a missing segmented character routine capable of identifying a segmented character that is missing in all of the successful parses generated by the parsing component and of indicating that the missing segmented character is confused with a confusable character.

25. The computer-readable medium of claim 14 further comprising a graphically confusable character list comprising confusable characters that are graphically similar to segmented characters, the confusable character component being capable of accessing the graphically confusable character list to identify confusable characters for the segmented characters.

26. The computer-readable medium of claim 14 further comprising a phonetically confusable character list comprising confusable characters that are phonetically similar to segmented characters, the confusable character component being capable of accessing the phonetically confusable character list to identify confusable characters for the segmented characters.

27. The computer-readable medium of claim 14 further comprising a graphically confusable character list comprising confusable characters that are graphically similar to segmented characters and a phonetically confusable character list comprising confusable characters that are phonetically similar to segmented characters, the confusable character component capable of determining the input method used to place the segmented characters in computer readable form and further capable of using the input method determination to select a single confusable character list to use in identifying confusable characters for the segmented characters.

28. A method of identifying confused characters in a text of characters utilizing lexical information for the characters of the text and lexical information for confusable characters that are commonly confused with the characters of the text, the method comprising:

parsing the text based on the lexical information for the characters of the text and the lexical information for the confusable characters to produce a successful parse; and identifying a character from the text that may have been confused for a confusable character based on the successful parse.

* * * * *

UNITED STATES PATENT AND TRADEMARK OFFICE
CERTIFICATE OF CORRECTION

PATENT NO. : 6,360,197 B1  Page 1 of 1
DATED : March 19, 2002
INVENTOR(S) : Wu et al.

It is certified that error appears in the above-identified patent and that said Letters Patent is hereby corrected as shown below:

Columns 9 and 10,
Replace line 64 through Column 10, line 13, with the following:

```
--      他  PRON1
         在  VERB1
         在  ADV1
         在  PREP1
          那里  PRON3
          那  PRON2
          那  CONJ1
          哪  PRON3
           里  NOUN1
             结  VERB2
              帐  POSP1 (n)
              账  NOUN2
               ?  CHAR1                  --
```

Column 10,
Replace lines 54 through 59 with the following:

```
--    QUES1——NP1————PRON1*    "他"
           \PP1<————PREP1     "在"
                \——PRON4*     "哪里"
            \VERB3*           "结账"
             \CHAR1           " ? "         --
```

Signed and Sealed this

Eighth Day of October, 2002

Attest:

Attesting Officer

JAMES E. ROGAN
Director of the United States Patent and Trademark Office